United States Patent [19]

Lin

[11] Patent Number: 5,100,963

[45] Date of Patent: Mar. 31, 1992

[54] PRESSURE-SENSITIVE ADHESIVES BASED ON SIMILAR POLYMERS

[75] Inventor: Kenneth S. C. Lin, San Marino, Calif.

[73] Assignee: Avery Dennison Corporation, Pasadena, Calif.

[21] Appl. No.: 906,333

[22] Filed: Sep. 11, 1986

Related U.S. Application Data

[63] Continuation-in-part of Ser. No. 711,500, Mar. 14, 1985, abandoned.

[51] Int. Cl.⁵ .................. C08L 33/02; C08L 33/06
[52] U.S. Cl. .................................... 525/221; 525/228
[58] Field of Search ............... 525/711, 500, 228, 221

[56] References Cited

U.S. PATENT DOCUMENTS

| | | | |
|---|---|---|---|
| 4,185,050 | 1/1980 | Lazear et al. | 525/221 |
| 4,282,140 | 8/1981 | Bousquet et al. | 525/228 |
| 4,400,486 | 8/1983 | Iwata et al. | 525/228 |

*Primary Examiner*—Jacob Ziegler
*Attorney, Agent, or Firm*—Christie, Parker & Hale

[57] ABSTRACT

A pressure-sensitive adhesive is formed from a high-molecular-weight polymer and is plasticized by a low-molecular-weight polymer, which polymers have monomer contents which differ by no more than 30 percent by weight.

24 Claims, 2 Drawing Sheets

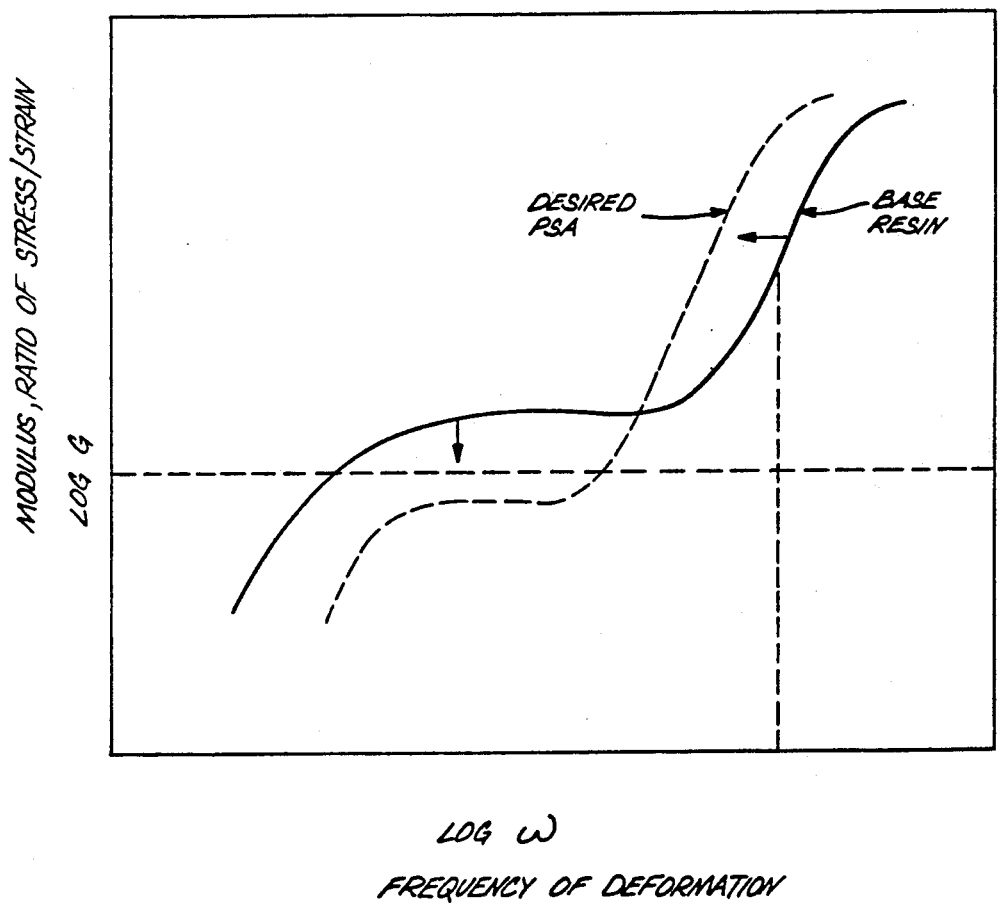

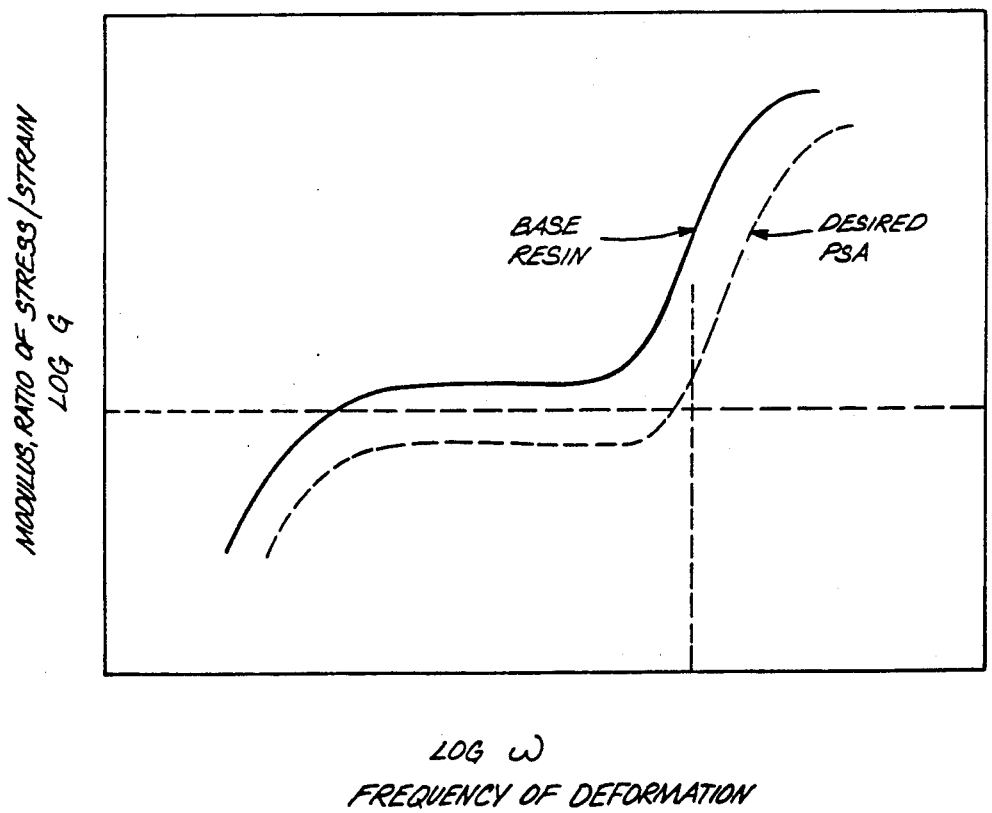

PRESSURE-SENSITIVE ADHESIVES BASED ON SIMILAR POLYMERS

CROSS-REFERENCE TO RELATED APPLICATIONS

This is a Continuation-in-Part of application Ser. No. 06/711,500, filed Mar. 14, 1985, now abandoned.

BACKGROUND OF THE INVENTION

A pressure-sensitive adhesive should be soft so that it can develop sufficient interfacial contact area with a substrate on application of very light pressure. It must, however, also be strong enough to resist debonding failure. Conventionally, this rate-dependent viscoelastic property of pressure-sensitive adhesives was achieved by blending tackifying resins with a rubber. More recently, there has been an increased interest in using polyacrylates among other polymers as pressure-sensitive adhesives for their superior weathering and aging properties. There are, however, some disadvantages in the use of such acrylic pressure-sensitive adhesives. The materials cost of the acrylates is higher than the conventional rubber-based adhesive, and tack performance is normally lower. In addition, it is difficult to find good tackifiers that are commercially available for acrylic adhesives. When a porous material such as paper is used as the facestock, many compounded acrylic adhesives are prone to have certain components "bleed" out and stain the facestock.

In 1964 Wetzel presented a model of a compoundable pressure-sensitive adhesive based on a resin and a sticky low-molecular-weight rubber in which a sticky low-molecular-weight tackifier was dispersed in the bulk of the base resin. Solid tackifiers have since been conventionally employed to induce pressure-sensitive characteristics to a base polymer. The effect of tackifier addition is shown in FIG. 1, attached hereto.

SUMMARY OF THE INVENTION

The present invention is directed to compatible mixtures of low- and high-molecular-weight polymers of similar molecular composition which may be combined to form novel products ranging from plasticized self-supporting films to pressure-sensitive adhesives.

In particular, the compositions of the invention are comprised of at least one high-molecular-weight polymer having a molecular-weight of greater than at least 10 times the entanglement molecular-weight thereof and which is not a pressure-sensitive adhesive, with at least one lower molecular-weight polymer having a molecular-weight which is less than 2 times the entanglement molecular-weight thereof and may or may not have pressure-sensitive adhesive properties, and differs in comonomer content from the high-molecular-weight polymer by no more than about 30 percent by weight preferably no more than 10 percent by weight. When combined, the mixture at least forms a plasticized self-supporting film preferably the mixture forms a pressure-sensitive adhesive having a glass-transition temperature at least 10° C. below use temperature preferably about 20° C. below use temperature. Glass-transition temperature of the mixed polymers with additives is most preferably at least about 40° C. below use temperature.

The presently preferred polymers are copolymers containing an alkyl acrylate and, while any copolymerizable comonomer can be used to modify the properties of the acrylate containing polymers, it is preferred to include styrene for cost reduction and at least a minor amount of an unsaturated carboxylic acid, preferably acrylic acid, to enable crosslinking and to enhance adhesive properties.

The low-molecular-weight polymer is preferably present in a concentration of from about 30 percent to about 80 percent by weight, based on the mixture of high- and low-molecular-weight polymers.

By combining the two polymers of highly similar chemical structure, one can obtain without loss of compatibility a wide range of properties including pressure-sensitive adhesive properties catered to end use applications. Alkali removability is feasible for the formed pressure-sensitive adhesives having an unsaturated carboxylic acid content of from about 5 percent to about 30 or more percent by weight. Properties, particularly high-temperature physical properties, can be enhanced by exposure of the mixture to crosslinking reactions, particularly free radical reactions such as induced by actinic radiation, electron-beam radiation, and chemical crosslinking reactions.

BRIEF DESCRIPTION OF THE DRAWINGS

FIG. 1 is a plot of the log of the shear modulus (Log G) or the log of the ratio of shear stress over shear strain vs. frequency of deformation (Log ω) for a base resin (solid line) modified by a tackifier system to form a pressure-sensitive adhesive of desired properties (dashed line).

FIG. 2 shows, on the same scale as FIG. 1, the formulation of a pressure-sensitive adhesive by plasticizing a high-molecular-weight polymer with a low-molecular-weight polymer.

DETAILED DESCRIPTION

According to the present invention, there are provided pressure-sensitive adhesives based on a mixture of elastomeric, high-molecular-weight polymers and normally liquid, low-molecular-weight polymers of identical or differing comonomeric content, which in combination, form novel products ranging from plasticized films to low-cost pressure-sensitive adhesives having a wide variety of properties including, when containing a copolymerized amount of unsaturated carboxylic acid, alkali removability.

Independent of monomer content, the high molecular polymers have a molecular-weight of at least 10 times their entanglement molecular-weight. Stated another way, they have a weight-average molecular-weight (Mw) of at least $10^5$ to about $5 \times 10^6$. "Entanglement molecular-weight" as used herein, is defined in *Viscoelastic Properties of Polymers*, 3rd Edition, John D. Ferry, John Wiley and Sons, 1981, incorporated herein by reference, which can be calculated using the formula:

$$M_e = 5.4 \times 10^4 \frac{\Sigma M}{\Sigma N} \left[ \frac{\Sigma V}{\Sigma N} - 1.48 \times 10^{-5} \right]^3$$

where:
M = molar weight of group
N = number of main chain carbon atoms per group
V = group contribution to molar volume The formula, M, N, and V are explained and supported in detail in *Computer Aided Design of Polymers*

*and Composites*, D. Kaeble, Marcel Dekker, Inc., 1985, pgs. 116 to 121, incorporated herein by reference.

The second component is a compatible, i.e. soluble low-molecular-weight, generally liquid polymer having essentially the same chemical constituency as the high-molecular-weight polymer. The second polymer has a molecular-weight which is less than 2 times the entanglement molecular-weight, and/or a weight-average molecular-weight of less than about $2 \times 10^4$, or less than about 20,000. The high- and low-molecular-weight polymers should contain at least about 25 percent by weight of a common monomer preferably about 50 percent or more preferably 80 to 100 percent of a common monomer. While other comonomers may be present, the chemical difference of the high-molecular-weight polymers should not differ from the monomer content of the low-molecular-weight polymer by more than about 30 percent by weight preferably not more than 10 percent by weight. The degree of difference allowable depends, however, on mutual monomer solubility with a greater differential permitted for monomers of high mutual solubility.

To this end, as used herein and in the claim, the words "molecular-weight" when referring to other than entanglement molecular-weight means "weight-average molecular-weight".

Any monomer can be employed in the practice of the invention so long as it is homopolymerizable or copolymerizable to meet the criteria specified for forming a pressure-sensitive adhesive.

Illustrative, but nowise limiting of functional monomers, are the alkyl acrylates such as methyl acrylate, ethyl acrylate, butyl acrylate, 2-ethylhexyl acrylate and the like; alkyl methacrylates such as methyl methacrylate, ethyl methacrylate, butyl methacrylate, 2-ethylhexyl methacrylate and the like; diesters of fumaric acid such as dibutyl fumarate and the like; unsaturated carboxylic acids preferably containing from 2 to about 6 carbon atoms such as acrylic acid, methacrylic acid, itaconic acid, fumaric acid and the like; aromatic monomers such as styrene, amethylstyrene and the like; and other monomers such as vinyl acetate, vinyl proportionate, acrylonitrile, ethylene, propylene, butadiene and the like. The presently preferred monomers are the alkyl acrylates, styrenic monomers and unsaturated carboxylic acids, the latter being limited to amounts of from about 2 to about 30 percent by weight of a comonomer system. It is presently preferred that the high-molecular polymer have a glass-transition temperature less than about 25° C. It is presently preferred that an alkyl acrylate be present in an amount of at least about 20 percent by weight based on the total weight of the monomers. There may be included in the mix of polymers other ingredients, such as anti-oxidant, colorants, UV absorbents, and the like.

The presently preferred pressure-sensitive adhesives of the invention comprise an alkyl acrylate polymer containing from about 50 percent to about 100 percent by weight polymerized acrylate in admixture with a low-molecular-weight alkyl acrylate polymer also containing at least about 50 percent by weight of the same alkyl acrylate in which the comonomer content of the high- and low-molecular-weight polymers differs by no more than about 10 percent by weight.

In conventional pressure-sensitive-adhesive system, a tackifier system is employed to modify properties of the base resin, and acts to raise the glass-transition temperature and to lower the rubber-plateau modulus of the base resin. This is shown in FIG. 1, wherein the solid line is the base resin and the dashed line is the desired pressure-sensitive adhesive (PSA).

In the practice of the instant invention and with reference to FIG. 2, the low-molecular-weight polymer acts as a plasticizer which lowers the glass-transition temperature and rubber plateau of the base resin (solid line) to adhere to the desired master curve (dashed line) for the pressure-sensitive adhesive.

The amount of low-molecular-weight polymer(s) added will depend on the nature of the high-molecular-weight polymer(s) and properties desired. The total low-molecular-weight polymer content will be in an amount of from about 30 percent to about 80 percent by weight, based on the total weight of the polymers. Within the same or a different range, the low-molecular-weight polymer can serve to plasticize the high-molecular-weight polymer or render the mixture a pressure-sensitive adhesive. This results, in both instances, in a stable non-blooming product in consequence to mutual compatibility due to substantial chemical identity of the polymers.

The components of formulations provided in accordance with the instant invention may be formed by emulsion, solvent or bulk polymerization. Emulsion polymerization is presently preferred.

Film or adhesive properties, especially high-temperature properties, may be enhanced by exposure of the mixture to the action of actinic radiation with or without the use of initiators as required, electron-beam radiation and/or chemical and/or thermal crosslinking using known crosslinking agents with or without the use of accelerators.

Besides separate formulation of the pressure-sensitive adhesives of this invention from individually polymerized high-molecular-weight polymers and low-molecular-weight polymers, and the polymerization of a mixture of monomers, polymerization can be conducted by initially polymerizing the polymer in the absence of a chain transfer agent to a desired solids level; and then by the inclusion in the polymerization system of a chain transfer agent to induce limitations on the molecular-weight of the polymeric chain in continued polymerization, to form an in situ mixture of high-molecular-weight polymers and low-molecular-weight polymers which, on deposition onto a face stock or a release surface provide a pressure-sensitive adhesive layer.

The compositions of this invention uniquely enable the adhesive coating of porous facestocks without bleed, may have wet-stick characteristics, namely the ability to adhere to surfaces on which moisture has condensed and when containing carboxylic-acid moieties, have the ability to be readily removed from a substrate by alkaline cleaning solutions and caustic solutions.

While nowise limiting, the following Examples are illustrative of the invention. "P" means panel failure; "C" means cohesive failure; "IPT" means immediate paper tear; "PS" means panel stain; "SPS" means slight panel stain; "ks" means kiloseconds; "F" means fail; and "PE" means polyethylene. Test methods utilized were as follows: molecular-weight distribution by ASTM D-3536-76, ASTM D-3590-68 and ASTM E-682-79; shear by ASTM D-3654-78 and D-1000-68 and PSTC (Pressure-Sensitive Tape Council) Test #7, 6th Edition; 90° peel by PSTC Test #2, 5th Edition; loop tack by PSTC Test #7, 6th Edition, mandrel by ASTM D-3654-

78 and D-1000-68. Vellum 80 was used as a facestock because it is highly absorbant and amplifies bleed.

EXAMPLES 1 TO 10

There were formed by emulsion polymerization, homopolymers of ethyl acrylate to provide a feasibility evaluation of the ability to form pressure-sensitive adhesives from high-molecular-weight and low-molecular-weight homopolymers of ethyl acrylate. Examples 1 to 3 disclose the formation of high-molecular-weight elastomeric resins, and Examples 5 to 7 disclose the formation of low-molecular-weight resins. Example 4 is a transitional example, showing the formation of a resin of reduced molecular-weight as a consequence of the introduction of a small quantity of n-dodecyl mercaptan (n-DDM) as a chain transfer agent. The polymerization conditions and polymer properties are shown in Table I. Solids content after polymerization was about 50 percent by weight. Table II shows the performance properties of mixtures of the polymers of Example 2 and Example 7.

TABLE I

| EXAMPLES | 1 | 2 | 3 | 4 | 5 |
|---|---|---|---|---|---|
| Monomer, pts Ethyl Acrylate | 100 | 100 | 100 | 100 | 100 |
| Surfactant | | | | | |
| N-111[1] | 3.6 | — | — | — | — |
| X-200[2] | — | 3.4 | — | — | — |
| CO-436[3] (60% solids) | — | — | 4.3 | — | — |
| CO-730[4] (60% solids) | — | — | — | 5.7 | 5.7 |
| Buffer (NH$_4$)$_2$CO$_3$ | .21 | .14 | .14 | .14 | .14 |
| Initiator | | | | | |
| (NH$_4$)$_2$S$_2$O$_8$ | .28 | .28 | .14 | .57 | .57 |
| t-BHP[5] | — | .28 | .28 | .57 | .57 |
| AWC[6] | .28 | .28 | .28 | .29 | .29 |
| Fe$^3$ + EDTA | Trace | Trace | Trace | Trace | Trace |
| Chain Transfer n-DDM | None | None | None | .57 | 1.50 |
| POLYMERIZATION CONDITIONS | Monomer Feed | Pre-Emulsion | Pre-Emulsion | Pre-Emulsion | Pre-Emulsion |
| Reactor Temperature, °K. | 308–318 | 333 | 333 | 308–313 | 308–313 |
| Jacket Temperature, °K. | 293–298 | 313 | 313 | 293 | 293 |
| Feed Time, ks | 3.6 | 3.6 | 3.6 | 2.7 | 2.7 |
| Cook-Off Time, ks | 1.8 | 1.8 | 1.8 | 1.8 | 1.8 |
| Cook-Off Temperature, °K. | 323 | 333 | 333 | 323 | 323 |
| Mw | 4.68 × 10$^5$ | 2.61 × 10$^5$ | 4.10 × 10$^5$ | 1.01 × 10$^5$ | 4.4 × 10$^4$ |
| Distribution Coefficient (Mw/Mn) | 3.4 | 8.1 | 4.6 | 8.1 | 3.2 |
| % Below 20,000 | 2.2 | 32.3 | 3.6 | 41.0 | 55.0 |

| EXAMPLES | 6 | 7 |
|---|---|---|
| Monomer, pts Ethyl Acrylate | 100 | 100 |
| Surfactant | | |
| N-111 | — | — |
| X-200 | — | — |
| CO-436 | — | — |
| CO-730 | 5.7 | 5.7 |
| Buffer (NH$_4$)$_2$CO$_3$ | .14 | .14 |
| Initiator | | |
| (MH$_4$)$_2$S$_2$O$_8$ | .57 | .57 |
| t-BHP | .57 | .57 |
| AWC | .29 | .29 |
| Fe$^3$ + EDTA | Trace | Trace |
| Chain Transfer n-DDM | 5.00 | 10.00 |
| POLYMERIZATION CONDITIONS | Monomer Feed | Pre-Emulsion |
| Reactor Temperature, °K. | 328 | 328 |
| Jacket Temperature, °K. | 313 | 313 |
| Feed Time, ks | 3.6 | 3.6 |
| Cook-Off Time, ks | 1.8 | 1.8 |
| Cook-Off Temperature, °K. | 333 | 333 |
| Mw | 2.15 × 10$^4$ | 1.78 × 10$^4$ |
| MWD | 2.3 | 2.3 |
| % Below 20,000 | 28.0 | 21.0 |

[1] a nonionic surfactant manufactured and sold by Rohm and Haas
[2] an anionic/nonionic surfactant manufactured and sold by Rohm and Haas
[3,4] an ethoxylated alkyl phenol surfactant manufactured and sold by GAF
[5] tert-butyl hydroperoxide
[6] sodium formaldehyde sulfoxylate

TABLE II

| | Examples 8 to 10 | | |
|---|---|---|---|
| | 8 | 9 | 10 |
| Blend. Ex. 2/Ex. 7 | 60/40 | 50/50 | 40/60 |
| Facestock | Vellum 80 | Vellum 80 | Vellum 80 |
| Coat Weight g/m$^2$ | 24 g. | 24 g. | 24 g. |

TABLE II-continued

| | Examples 8 to 10 | | |
|---|---|---|---|
| | 8 | 9 | 10 |
| Quick Stick | | | |
| Recycled Cardboard | Good | Good | Good |
| Polyethylene | Good | Good | Good |
| 0.500 kg Shear, ks | (NA) | 0.1(C) | (NA) |
| 90° Peel (N/m) | 208(P) | 172(P) | 156(P) |

TABLE III

| EXAMPLE | 11 | 12 | 13 | 14 | 15 | 16 |
|---|---|---|---|---|---|---|
| Reactor Charge | | | | | | |
| $H_2O$ | 200 | 200 | 200 | 200 | 200 | 200 |
| CO-436 (60%) | 1.0 | 1.0 | 1.0 | 1.0 | 1.0 | 1.0 |
| $Fe^{3+}$ + EDTA | 0.1 | 0.1 | 0.1 | 0.1 | 0.1 | 0.1 |
| $Na_2P_2O_7$ | 1.0 | 1.0 | 1.0 | 1.0 | 1.0 | 1.0 |
| $(NH_4)_2CO_3$ | 1.5 | 1.5 | 1.5 | 1.5 | 1.5 | 1.5 |
| $(NH_4)_2S_2O_8$ | 4.0 | 4.0 | 4.0 | — | — | — |
| Pre-Emulsion | | | | | | |
| $H_2O$ | 300 | 300 | 300 | 300 | 300 | 300 |
| CO-436 (60%) | 20 | 20 | 20 | 20 | 20 | 20 |
| TREM-L-40 (40%)[7] | 10 | 10 | 10 | 10 | 10 | 10 |
| Ethyl Acrylate | 630 | 648 | 606 | 630 | 648 | 686 |
| Acrylic Acid | 70 | 52 | 14 | 70 | 52 | 14 |
| Dodecyl Mercaptan | 70 | 70 | 70 | — | — | — |
| t-BHP | 4.0 | 4.0 | 4.0 | 1.0 | 1.0 | 1.0 |
| Accelerator | | | | | | |
| $H_2O$ | 100 | 100 | 100 | 100 | 100 | 100 |
| AWC | 2.0 | 2.0 | 2.0 | 2.0 | 2.0 | 2.0 |
| Product | | | | | | |
| Solids 8% | 55 | 55.2 | 55.5 | 52.7 | 53.1 | 53.1 |
| Viscosity, CPS | 410 | — | — | 1950 | 1000 | 2300 |
| pH | 4.2 | — | — | 5.0 | 5.1 | 6.3 |
| Mw | $1.0 \times 10^4$ | $1.1 \times 10^4$ | $1.3 \times 10^4$ | $4.8 \times 10^5$ | $5.7 \times 10^5$ | $3.2 \times 10^5$ |
| Dispersity Index | 2.1 | 2.1 | 2.3 | 4.6 | 4.9 | 4.5 |
| Wt. % Acrylic Acid | 10 | 6 | 2 | 10 | 6 | 2 |

[7] A sodium alkyl allyl sulfosuccinate manufactured and sold by Diamond Shamrock

TABLE IV

| | Examples 17 to 42 | | | | | | | |
|---|---|---|---|---|---|---|---|---|
| EXAMPLE | 17 | 18 | 19 | 20 | 21 | 22 | 23 | 24 |
| % Acrylic Acid in High-Mol.-Wt. Polymer | 10 | 10 | 2 | 2 | 6 | 6 | 6 | 6 |
| % Acrylic Acid in Low-Mol.-Wt. Polymer | 10 | 2 | 10 | 2 | 6 | 6 | 6 | 6 |
| Wt. % of Low-Mol.-Wt. Polymer in Blend | 50 | 50 | 50 | 50 | 75 | 75 | 25 | 25 |
| Crosslinking Agent* CX-100 (%) | 0.4 | 0.4 | 0.4 | 0.4 | 0.8 | 0 | 0.8 | 0 |
| Finat Tack* | 365.7(P) | 77(P) | 578(P) | 271(P) | 443(P) | 443(P) | 462(P) | 154(P) |
| Loop Tack (PE) | 170(PS) | 77(P) | 230(PS) | 160(PS) | 250(PS) | 420(PS) | 100(PS) | 150(PS) |
| 90° Peel (PE) | 190(PS) | 38(PS) | 290(PS) | 200(PS) | 270(PS) | 270(PS) | 77(PS) | 190(PS) |
| 90° Peel (SS) | 500(IPT) | 120(PS) | 410(PS) | 230(PS) | 420(SPS) | 650(PS/F) | 310(IPT) | 460(IPT) |
| Shear (0.5 kg) | 78** | 0.08(C) | 0.75(C) | 0.18(C) | 1.98(C) | 0.24(C) | 245** | 21.9(PF) |
| ½" Mandrel (PE) (12.7 mm, 7 days) | <0.4 | Fail (11.2) | 8.0 | 0.4 | 0.8–0.8 1.6–6.4 | 1.6–1.6 | Fail (11.2) | <0.4 |
| Bleed Resistance at 60° C. (1 week) | Very Good | Very Poor | Good | Good | Poor | Good | Very Good | Good |

| EXAMPLE | 25 | 26 | 27 | 28 | 29 | 30 | 31 | 32 |
|---|---|---|---|---|---|---|---|---|
| % Acrylic Acid in High-Mol.-Wt. Polymer | 6 | 10 | 10 | 2 | 2 | 6 | 6 | 6 |
| % Acrylic Acid in Low-Mol.-Wt. Polymer | 6 | 6 | 6 | 6 | 6 | 10 | 10 | 2 |
| Wt. % of Low-Mol.-Wt. Polymer in Blend | 75 | 75 | 50 | 50 | 50 | 75 | 25 | 75 |
| Crosslinking Agent* CX-100 (%) | 0.4 | 0.8 | 0 | 0.8 | 0 | 0.4 | 0.4 | 0.4 |
| Finat Tack* | 270(P) | 347(P) | 193(P) | 438(P) | 158(P) | 616(P) | 443(P) | 308(P) |
| Loop Tack (PE) | 230(PS) | 150(P) | 160(PS) | 260(PS) | 190(P) | 270(PS) | 38(PS) | 190(PS) |
| 90° Peel (PE) | 250(PS) | 120(P) | 230(PS) | 400(PS/F) | 220(S) | 260(PS) | 50–200*** | 110(PS) |
| 90° Peel (SS) | 460(IPT) | 390(IPT) | 580(IPT) | 290(P) | 280(PS) | 620(IPT) | 400(IPT) | 230(PS) |
| Shear (500/wk) | 26.6(PS) | 237** | 1.98(C) | 1.1(C/$P^2$/1) | 1.36(C/$P^3$/1) | 0.9(C) | 240** | 0.18(C) |
| ½" Mandrel (PE) (12.7 mm, 7 days) | <0.4 | Fail (11.2) | <0.4 | 8.0–9.6 8.0–3.2 | 8.0–9.6 9.6–9.6 | 0.4 | 6.4–1.6 4.8–4.8 | Fail (11.2) |
| Bleed Resistance | Good | Very | Good | Very | Good | Very | Very | Very |

TABLE IV-continued

Examples 17 to 42

| | | | | | | | |
|---|---|---|---|---|---|---|---|
| at 60° C. (1 week) | Good | | Good | | Good | Good | Poor |
| EXAMPLE | 33 | 34 | 35 | 36 | 37 | 38 | 39 |
| % Acrylic Acid in High-Mol.-Wt. Polymer | 6 | 6 | 10 | 10 | 2 | 2 | 6 |
| % Acrylic Acid in Low-Mol.-Wt. Polymer | 2 | 6 | 6 | 6 | 6 | 6 | 10 |
| Wt. % of Low-Mol.-Wt. Polymer in Blend | 25 | 50 | 75 | 25 | 75 | 25 | 50 |
| Crosslinking Agent* CX-100 (%) | 0.4 | 0.4 | 0.4 | 0.4 | 0.4 | 0.4 | 0.8 |
| Finat Tack* | 520(P) | 347(P) | 385(P) | 115(P)*** | 350(P) | 17.5(P) | 446(P) |
| Loop Tack (PE) | 100(PS) | 160(PS) | 290(P) | 40(PS) | 220(PS) | 140(PS) | 140(PS) |
| 90° Peel (PE) | 130(PS) | 200(P) | 250(PS) | 35–120*** | 200(F/P) | 120(P) | 53–200*** |
| 90° Peel (SS) | 390(IPT) | 540(IPT) | 480(SPS) | 380(IPT) | 210(F/P) | 190(P) | 460(IPT) |
| Shear (500/wk) | 142** | 30.9(PS/F) 16.9(P/F) | 1.16(C) | 85** | 0.26(C/P¹/1) | 2.73(C/P) | 18.9(P/C) |
| ½" Mandrel (PE) (12.7 mm, 7 days) | Fail (11.2) | <0.4 0.4–0.4 | 0.8–0.8 6.4–4.8 | Fail (11.2) | 1.6–3.2 | 8.0–0.8 | Fail (11.2) |
| Bleed Resistance at 60° C. (1 week) | Good | Very Good | Good | Very Good | Poor | Good | Very Good |

| | | | |
|---|---|---|---|
| EXAMPLE | 40 | 41 | 42 |
| % Acrylic Acid in High-Mol.-Wt. Polymer | 6 | 6 | 6 |
| % Acrylic Acid in Low-Mol.-Wt. Polymer | 10 | 2 | 2 |
| Wt. % of Low-Mol.-Wt. Polymer in Blend | 50 | 50 | 50 |
| Crosslinking Agent* CX-100 (%) | 0 | 0.8 | 0 |
| Finat Tack* | 269(P) | 366(P) | 192(P) |
| Loop Tack (PE) | 210(PS) | 120(PS) | 230(PS) |
| 90° Peel (PE) | 240(PS) | 120(PS) | 180(PS) |
| 90° Peel (SS) | 460(IPT) | 330(F) | 480(P) |
| Shear (500/wk) | 4.79(C) | 7.5(PS) 19.3(PS) | 4.74(C) |
| ½" Mandrel (PE) (12.7 mm, 7 days) | 0.8–0.8 | Fail (11.2) | 0.8–0.8 |
| Bleed Resistance at 60° C. (1 week) | Very Good | Poor | Very Good |

*Loop tack to glass
**No slip
***Slip stick

EXAMPLES 11 TO 42

While the results of Examples 1 to 10 establish the feasibility of the use of polyethyl acrylate homopolymers, in the formation of general-purpose pressure-sensitive adhesives from materials which would otherwise not have pressure-sensitive adhesive characteristics, it was determined to use a carboxylic acid as part of the emulsion polymerization system to form adhesives of varying properties, as a consequence of not only acid content but of the use of a crosslinking agent as well. The carboxylic acid employed was acrylic acid. In Table III, Examples 11 to 16 show, respectively, the conditions for the formation of high- and low-molecular-weight ethyl acrylate/acrylic acid copolymers having 10 percent, 6 percent, and 2 percent by weight acrylic acid. Table IV, Examples 17 to 42, shows the adhesive properties of combinations of the polymers formed in Examples 11 to 16. In preparation of the polymers, 50 parts of the pre-emulsion was added to a reactor charge at 40° C. and, while that temperature was maintained, the balance was added over 60 minutes. Heating continued for 30 minutes at 60° C. Five parts of the accelerator were added to the reactor charge and the balance to the pre-emulsion.

EXAMPLE 43

An adhesive formulation showing good alkali removability for use in recycle labeling of beverage containers was formulated from 25 parts by weight of a high-molecular-weight polymer containing about 96 percent by weight ethyl acrylate and 4 percent by weight acrylic acid and having a molecular-weight of about 400,000; and 75 percent by weight of a low-molecular-weight polymer containing 88 percent by weight ethyl acrylate and 12 percent by weight acrylic acid and having a molecular-weight of less than about 12,000. A particular utility of the adhesive is to label recyclable beer kegs where the label is removed by caustic on recycle for refilling.

EXAMPLE 44

There was in the manner of the previous Examples formed by emulsion polymerization high- and low-molecular-weight polymers, each respectively containing 40 parts by weight styrene, 60 parts by weight 2-ethyl hexyl acrylate, and 4 parts by weight acrylic acid. The high-molecular-weight polymer had a weight-average molecular-weight (Mw) of 540,000 and a calculated entanglement molecular-weight (Me) of 33,000 and was non-tacky. The low-molecular-weight polymer had a weight-average molecular-weight (Mw) of 43,000 and a calculated entanglement molecular-weight of 33,000. Table V shows the properties of the low-molecular-weight polymer (LMP) and a mixture of one part high-molecular-weight polymer per two parts low-molecular-weight polymer (MIX).

TABLE V

| Property | LMP | MIX |
| --- | --- | --- |
| Shear 25° C., min. | 3 | 47 |
| Loop Tack, N/m | 275 | 10 |
| Peel, N/m | 538 (c) | 300 (p) |

The MIX provided a low-tack, non-staining repositionable pressure-sensitive adhesive of improved cohesive strength.

What is claimed is:

1. A pressure-sensitive adhesive composition comprising in combination, at least one high-molecular-weight elastomer polymer having a molecular-weight greater than 10 times the entanglement molecular-weight of the polymer and a weight average molecular weight of at least $10^5$ and at least one low molecular-weight liquid polymer, the total low-molecular-weight polymer being present in an amount of from about 30 percent by weight to about 80 percent by weight based on the total weight of said high-molecular-weight polymers and said low-molecular-weight polymers, said low-molecular-weight polymer being formed at least in part of monomers identical to the monomers of said high-molecular-weight polymer, having a molecular-weight less than 2 times the entanglement molecular-weight of the polymer, and a weight average molecular weight of less than about $2 \times 10^4$, the monomeric content of said low-molecular-weight polymer differing by no more than about 30 percent by weight from the monomeric content of said high-molecular-weight polymer, said mixture of high- and low-molecular-weight polymers forming in combination a pressure-sensitive adhesive having a glass transition temperature of at least 10° C. below use temperature.

2. A pressure-sensitive adhesive composition as claimed in claim 1 in which the monomeric content of said low-molecular-weight polymer differs by no more than 10 percent by weight from the monomeric content of the molecular-weight polymer.

3. A pressure-sensitive adhesive composition as claimed in claim 1 in which the glass-transition temperature of the combination of high- and low-molecular-weight polymers is at least 20° C. below the use temperature.

4. A pressure-sensitive-adhesive composition as claimed in claim 1 in which the high- and the low-molecular-weight polymers comprise a polymerized amount of an alkyl acrylate and styrene.

5. A pressure-sensitive-adhesive composition as claimed in claim 4 in which the alkyl acrylate is selected from the group consisting of 2-ethylhexyl acrylate, butyl acrylate, isooctyl acrylate and mixtures thereof.

6. A pressure-sensitive-adhesive composition as claimed in claim 1 in which the high- and low-molecular-weight polymers comprise an interpolymerized amount of an unsaturated carboxylic acid.

7. A pressure-sensitive-adhesive composition as claimed in claim 6 in which the carboxylic acid is acrylic acid or methacrylic acid.

8. A pressure-sensitive-adhesive composition as claimed in claim 5 in which the high- and low-molecular-weight polymers contain an interpolymerized amount of acrylic acid or methacrylic acid.

9. A pressure-sensitive adhesive composition comprising in combination, at least one high-molecular-weight polymer having a molecular-weight greater than 10 times the entanglement molecular-weight of the high-molecular-weight polymer and a weight average molecular weight of from at least $10^5$ to about $5 \times 10^5$ and at least one low molecular-weight polymer, the total low-molecular-weight polymer being present in an amount of from about 30 percent by weight to about 80 percent by weight based on the total weight of said high-molecular-weight polymers and said low-molecular-weight polymers, each of said high- and low-molecular-weight polymers being formed at least 20 percent by weight of monomers having a glass-transition temperature which if homopolymerized would be less than about 25° C., said low-molecular-weight polymer having a molecular-weight less than 2 times the entanglement molecular-weight of such polymer, and a weight average molecular weight of less than about $2 \times 10^4$, the comonomer contents of said high-molecular-weight polymer and the monomeric content of said low-molecular-weight polymer differing by no more than about 10 percent by weight from the monomeric content of said high-molecular-weight polymer, said mixture of high- and low-molecular-weight polymers forming in combination a pressure-sensitive adhesive having a glass-transition temperature at least 30° C. below use temperature.

10. A pressure-sensitive adhesive as claimed in claim 9 in which at least about 50 percent by weight of the monomeric content of said high- and low-molecular-weight polymers is an alkyl acrylate.

11. A pressure-sensitive adhesive as claimed in claim 10 in which at least about 60 percent by weight of the monomeric content of said high- and low-molecular-weight monomers is an alkyl acrylate.

12. A pressure-sensitive-adhesive composition as claimed in claim 10 in which the alkyl acrylate is selected from the group consisting of 2-ethylhexyl acrylate, butyl acrylate, isooctyl acrylate and mixtures thereof.

13. A pressure-sensitive-adhesive composition as claimed in claim 11 in which the alkyl acrylate is selected from the group consisting of 2-ethylhexyl acrylate, butyl acrylate, isooctyl acrylate and mixtures thereof.

14. A pressure-sensitive adhesive as claimed in claim 9 in which the high- and low-molecular-weight polymers each include an interpolymerized amount of styrene.

15. A pressure-sensitive adhesive as claimed in claim 10 in which the high- and low-molecular-weight polymers each include an interpolymerized amount of styrene.

16. A pressure-sensitive adhesive as claimed in claim 12 in which the high- and low-molecular-weight polymers each include an interpolymerized amount of styrene.

17. A pressure-sensitive adhesive as claimed in claim 13 in which the high- and low-molecular-weight polymers each include an interpolymerized amount of styrene.

18. A pressure-sensitive adhesive as claimed in claim 10 in which the high- and low-molecular-weight polymers each contain an interpolymerized amount of an unsaturated carboxylic acid.

19. A pressure-sensitive adhesive as claimed in claim 15 in which the high- and low-molecular-weight polymers each contain an interpolymerized amount of acrylic acid or methacrylic acid.

20. A pressure-sensitive adhesive as claimed in claim 18 in which the high- and low-molecular-weight polymers each contain an interpolymerized amount of acrylic acid or methacrylic acid.

21. A pressure-sensitive adhesive composition comprising a high-molecular-weight polymer comprised of an interpolymerized amount of 2-ethylhexyl acrylate and styrene, said high-molecular-weight polymer having a molecular-weight which is at least 10 times the entanglement molecular-weight, and a weight average molecular eight of at least $10^5$, and a low-molecular-weight polymer having a molecular-weight of less than 2 times the entanglement molecular-weight and a weight average molecular weight of less than about $2 \times 10^4$ comprised of an interpolymerized amount of 2-ethylhexyl acrylate and styrene, and differing from the high-molecular-weight polymer in monomer content by no more than about 10 percent by weight, said low-molecular-weight polymer being present in a concentration of from about 30 to 80 percent by weight, based on the total weights of the high-molecular-weight polymer and the low-molecular-weight polymer, and providing a composition having a glass-transition temperature of at least about 20° C. below use temperature.

22. A pressure-sensitive-adhesive composition as claimed in claim 21 in which at least one of the high-molecular-weight polymers and low-molecular-weight polymers contains an interpolymerized amount of an unsaturated carboxylic acid.

23. A pressure-sensitive adhesive as claimed in claim 22 in which the carboxylic acid is acrylic acid.

24. A pressure-sensitive adhesive composition comprising in combination, from a high-molecular-weight elastomeric polymer prepared by emulsion polymerization and having a molecular weight greater than ten times the entanglement molecular weight of the polymer and a weight average molecular weight of at least about $10^5$ and formed of 90 to 100 parts by weight ethyl acrylate and 0 to 10 parts by weight acrylic acid and at least one low-molecular-weight polymer, prepared by emulsion polymerization, the total low-molecular-weight polymer being present in an amount of from about 30 percent by weight to about 80 percent by weight based on the total weight of said high-molecular-weight polymers and said low-molecular-weight polymers, said low-molecular-weight polymer being formed of 90 to 100 parts by weight ethyl acrylate and 0 to 10 parts by weight acrylic acid and having a molecular weight less than two times the entanglement molecular weight of the polymer, and a weight average molecular weight of less than about $2 \times 10^4$, the monomeric content of said low-molecular-weight polymer differing by no more than about 10 percent by weight from the monomeric content of said high-molecular-weight polymer, said mixture of high- and low-molecular-weight polymers forming in combination a pressure-sensitive adhesive having a glass transition temperature of at least 30° C. below use temperature.

* * * * *

UNITED STATES PATENT AND TRADEMARK OFFICE
CERTIFICATE OF CORRECTION

PATENT NO. : 5,100,963

DATED : March 31, 1992

INVENTOR(S) : Kenneth S.C. Lin

It is certified that error appears in the above-identified patent and that said Letters Patent is hereby corrected as shown below:

Column 1, line 62, change "about20°" to -- about 20° --.
Column 3, line 2, change "pgs." to -- pp. --.
Column 3, line 41, change "αmethylstyrene" to
      -- α-methylstyrene --.
Column 3, line 65, before "conventional" insert -- a --.
Column 8, Table II, after "shear" change the period to a
      comma.
Column 8, Table III, change "EXAMPLE" to -- EXAMPLES --.
Columns 7,8, TABLE IV, change "EXAMPLE" to -- EXAMPLES --
      (both occurrences).
Column 9, line 2, change "Examples 17 to 42" to
      -- Examples 25 to 32 --.
Column 9, line 28, change "EXAMPLE" to -- EXAMPLES --.

In the Claims:

Column 13, line 10, change "eight" to -- weight --.

Signed and Sealed this

Tenth Day of August, 1993

Attest:

MICHAEL K. KIRK

Attesting Officer     Acting Commissioner of Patents and Trademarks